United States Patent
Park et al.

(10) Patent No.: US 9,557,492 B2
(45) Date of Patent: Jan. 31, 2017

(54) FIBRE STUB DEVICE AND METHOD USING BUTT COUPLING FOR RECEPTACLED PHOTONIC DEVICES

(71) Applicant: Semtech Corporation, Camarillo, CA (US)

(72) Inventors: Christopher A. Park, Bacton (GB); Nayla El Dahdah, Bishop's Stortford (GB)

(73) Assignee: Semtech Corporation, Camarillo, CA (US)

( * ) Notice: Subject to any disclaimer, the term of this patent is extended or adjusted under 35 U.S.C. 154(b) by 26 days.

(21) Appl. No.: 14/329,614

(22) Filed: Jul. 11, 2014

(65) Prior Publication Data

US 2016/0011379 A1    Jan. 14, 2016

(51) Int. Cl.
    *G02B 6/38*        (2006.01)
    *G02B 6/42*        (2006.01)

(52) U.S. Cl.
    CPC ........... *G02B 6/3826* (2013.01); *G02B 6/3855* (2013.01); *G02B 6/4292* (2013.01)

(58) Field of Classification Search
CPC ... G02B 6/3826; G02B 6/3855; G02B 6/4292; G02B 6/255; G02B 6/2555; G02B 6/381; G02B 6/3818; G02B 6/382; G02B 6/3833; G02B 6/3846; G02B 6/3854; G02B 6/3869; G02B 6/3873; G02B 6/3874; G02B 6/3877; G02B 6/3878; G02B 6/42; G02B 6/421; G02B 6/4219; G02B 6/4228; G02B 6/423; G02B 6/4239; G02B 6/4285

See application file for complete search history.

(56) References Cited

U.S. PATENT DOCUMENTS

| | | | |
|---|---|---|---|
| 7,059,780 B2 | 6/2006 | Yamabayashi et al. | |
| 7,258,495 B1 | 8/2007 | Hughes et al. | |
| 7,421,164 B2 * | 9/2008 | Cho | G02B 6/4201 372/102 |
| 7,572,070 B2 * | 8/2009 | Sasaki | G02B 6/381 385/88 |

FOREIGN PATENT DOCUMENTS

| | | |
|---|---|---|
| EP | 2270561 A1 | 1/2011 |
| WO | 03/067294 A2 | 8/2003 |

* cited by examiner

*Primary Examiner* — John M Bedtelyon
(74) *Attorney, Agent, or Firm* — Robert D. Atkins; Patent Law Group: Atkins and Associates, P.C.

(57) ABSTRACT

A novel, hybrid optical fiber stub device comprises a first ferrule transparent to UV light and a second ferrule including a conventional material. An optical fiber is disposed through the first ferrule and second ferrule. The input and output faces of the optical fiber are prepared suitable for optical coupling. A photonic device is coupled to the first optical fiber surface. A UV curable epoxy is disposed between the photonic device and the first optical fiber surface. The UV curable epoxy includes an index of refraction between an index of refraction of the first optical fiber and an index of refraction of the photonic device. A second optical fiber is coupled to the first optical fiber.

20 Claims, 3 Drawing Sheets

FIBRE STUB DEVICE AND METHOD USING BUTT COUPLING FOR RECEPTACLED PHOTONIC DEVICES

FIELD OF THE INVENTION

The present invention relates to the field of photonic optical fibre based devices including those used for data communications, sensing, or other applications, and in particular, to the coupling of a photonic device to an optical fibre through a fibre stub receptacle.

BACKGROUND OF THE INVENTION

The increased use of photonic devices in many applications is driving the need for reduced cost and improved assembly methods. One of the major difficulties in using photonic devices is the coupling to optical fibres required for transmission from one photonic device to another. Efficient, simple methods of coupling the photonic devices at both ends of the optical link are highly desirable.

Existing photonic devices include lasers, detectors, modulators, switches, attenuators, optical multiplexers and de-multiplexers, gratings, couplers and other devices where a function is achieved in a photonic device. Photonic devices are manufactured from a variety of materials including silica, silicon, silicon-Germanium, Indium Phosphide, Gallium Arsenide, Lithium Niobate and other materials that exhibit optical emitting, detection, or guiding properties.

Existing methods for coupling photonic devices to optical fibres efficiently include some form of mode matching because the optical waveguides have a different size than the core of an optical fibre. One method of mode matching involves using lenses. The use of lenses for mode matching adds cost and manufacturing complexity to the photonic device. An alternative method of mode matching involves manufacturing a V groove adjacent to the waveguide such that the optical fibre can locate in the V groove and be correctly positioned with respect to the waveguide. The V groove method requires larger photonic devices to provide space for the V groove which increases the cost of the photonic device. Additionally, manufacturing the V grooves requires additional processing steps compared to manufacturing integrated photonic devices without V grooves, which also increases the cost of the photonic device.

Another method of mode matching involves producing a tapered region in a waveguide during the manufacturing of the photonic device. Creating a tapered region in the waveguide addresses the issues created because the optical waveguides have a different size than the core of the optical fibre. By using a tapered region in the waveguide for mode matching, it is possible to butt couple the optical fibre to the waveguide and obtain efficient transfer of light between the waveguide and the optical fibre. Butt coupling removes the need for lensing and complicated alignment procedures and is the preferred option for integrated photonic assemblies. Accordingly, a method is required to efficiently and easily butt couple optical fibre to a photonic device using the edge of the waveguide.

SUMMARY OF THE INVENTION

Disclosed herein are various embodiments of devices, components, and techniques for efficient coupling of photonic devices to an optical fibre via a novel fibre stub.

In one embodiment of the invention a novel fibre stub comprises a first stub transparent to UV light and a second ferrule both connected by the same piece of continuous optical fibre through both stubs and enclosed in an outer sleeve to enable efficient optical coupling to an input fibre connector.

Another embodiment of the invention comprises the novel fibre stub with the UV transparent end coupled to a photonic waveguide device using UV epoxy attach methods. The UV epoxy is placed between the novel fibre stub and the waveguide and then cured using UV exposure procedures. Once cured the photonic device can be interfaced directly to an optical connector.

A further embodiment uses the same invention to prepare a novel fibre stub containing multimode fibre instead of single mode fibre. Multimode fibre commonly has the same cladding diameter as single mode fibre of 125 um and therefore can be placed in the same novel fibre stub for applications where multimode fibre is preferred.

In addition to the foregoing embodiments of the present invention, review of the detailed description and accompanying drawings will show that other embodiments of the present invention exist. Accordingly, many combinations, permutations, variations, and modifications of the foregoing embodiments of the present invention not set forth explicitly herein will nevertheless fall within the scope of the present invention.

DETAILED DESCRIPTION OF THE DRAWINGS

Figure 1:
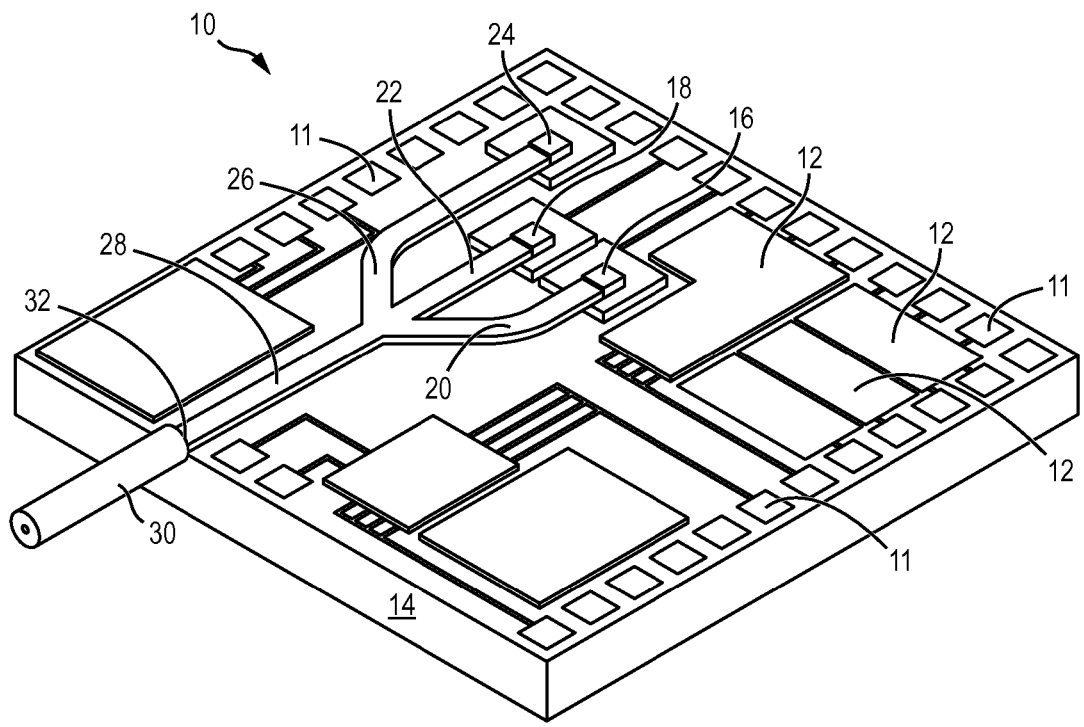
FIG. 1 shows an example of a photonic and electronic subassembly.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings. As employed in the drawings, specification, and claims the term fibre stub includes a short length of fibre encased in a block of material, usually cylindrical such that the fibre is positioned along the central axis of the block.

The present application describes a novel fibre stub which allows optical access for UV curing by presenting an interface to the photonic device which is transparent to UV light, thereby enabling the use of UV curable epoxies. Additionally, the novel fibre stub uses standard fibre interfaces. The present invention includes optical transceivers for datacoms. Additionally, the present invention can be used in any situation where an optical fibre is attached to a photonic device by butt coupling a fibre stub.

Many photonic devices are used in optical transceivers where optical and electronic functions are combined. The datacom industry has spearheaded the adoption of standards and specifications for optical transceivers. Many optical transceivers are receptacled which means they interface to an optical fibre through a receptacle where an optical connector interface is included in the transceiver. The optical connector interface conforms to a standard commonly known in the industry by acronym for example LC (Lucent Connector), MPO (Multiple fibre Push On), SC (Subscriber Connector), FC (Ferrule Connector), and so on. Optical connector standards enable the optical connectors to interface correctly with the optical fibres. Accordingly, an optical transceiver will specify which standard optical connector interface the optical transceiver is configured to accept.

The single fibre connectors use a fibre stub which is a length of optical fibre held in an accurately dimensioned ceramic stub and polished at both ends to create a good optical surface. The ceramic stub is optionally held in an accurately dimensioned ceramic sleeve which also accepts the incoming optical connector with the transmission fibre attached. The second ceramic sleeve co-locates the optical fibres for efficient coupling from the transmission fibre to the optical transceiver.

Inside the transceiver, the polished fibre stub is interfaced to the waveguide of the photonic device, using butt coupling with an optical fibre. A tapered region in the waveguide is provided for mode matching within the photonic device edge. However, in conventional fibre stubs, the optical fibres are surrounded by materials which are opaque to UV light. Many photonic device waveguides are also opaque to UV light. Accordingly, the junction between the optical fibre and the waveguide is not accessible to UV light. Thus, conventional fibre stubs lack the ability to utilize UV curable epoxies for improving butt coupling of optical fibres to waveguides. UV curable epoxies used between the optical fibre and the waveguide improve butt coupling of optical fibres to waveguides. The UV curable epoxy technique of the present invention provides stability and refractive index matching for the optical fibre, thereby reducing optical reflections associated with refractive index mismatch and improving butt coupling between the optical fibre and the waveguide.

FIG. 1 shows one example of a photonic device 10. Input/output (IO) pads 11 are formed on base substrate 14. Active electrical circuitry 12 is formed on base substrate 14. Optical transmitters 16 and 18 convert electrical signals from electrical circuitry 12 on semiconductor device 10 into optical signals. Optical transmitters 16 and 18 include silicon lasers, silicon germanium lasers, indium phosphide lasers, LEDs, or other suitable photon emitting devices. The optical signals leave optical transmitters 16 and 18 and enter waveguides 20 and 22, respectively. Waveguides 20 and 22 include silicon, silica, indium phosphide, Gallium Arsenide, Lithium Niobate, or other suitable optical medium. Optical receiver 24 converts an optical signal into an electrical signal for use by electrical circuitry 12 on semiconductor device 10. Optical receiver 24 includes silicon germanium, InGaAs, silicon, or other optoelectronic material. Waveguide 26 transports an optical signal from waveguide 28 to optical receiver 24. Waveguides 26 and 28 include silicon, silica, indium phosphide, Gallium Arsenide, Lithium Niobate, or other suitable optical medium. Once the optical signal is converted to an electrical signal, the electrical signal is available for use by electrical circuitry 12. Waveguides 20 and 22 transport optical signals from optical transmitters 16 and 18 to waveguide 28. Waveguide 28 and optical fibre 30 meet at junction 32. Waveguide 28 is butt coupled to optical fibre 30 at junction 32.

Butt coupling is a method of joining two optical fibres or an optical fibre to a waveguide. When joining optical fibre 30 to waveguide 28, the end of the optical fibre is polished and the optical fibre is aligned to the connection point on the waveguide. When an air gap exists between optical fibre 30 and waveguide 28, the light passes from the optical fibre to the air, and then from the air to the waveguide. When light passes from optical fibre 30 to the air, a portion of the light reflects back into the fibre due to the difference in index of refraction between the optical fibre core medium and air. Similarly, when light passes from the air to waveguide 28, a portion of the light reflects back into the air due to the difference in index of refraction between the waveguide and air. One way to reduce these reflections is to allow the end of optical fibre 30 and the connection point of waveguide 28 to come into direct physical contact. Another way to reduce the reflections is to surround the end of optical fibre 30 and the connection point of waveguide 28 with a gel or epoxy having a refractive index matching the refractive indices of the optical fibre and the waveguide. When the end of optical fibre 30 and the connection point of waveguide 28 are surrounded by a material with matching refractive index, the light does not encounter a boundary between two refractive indices as it travels between the optical fibre and the waveguide across the connection.

Optical fibre 30 and waveguide 28 are aligned to ensure the optical signal propagates from the optical fibre into the waveguide properly. A fibre stub helps ensure proper alignment of the optical fibre by holding the optical fibre in place in the center of a ferrule.

Figure 2:
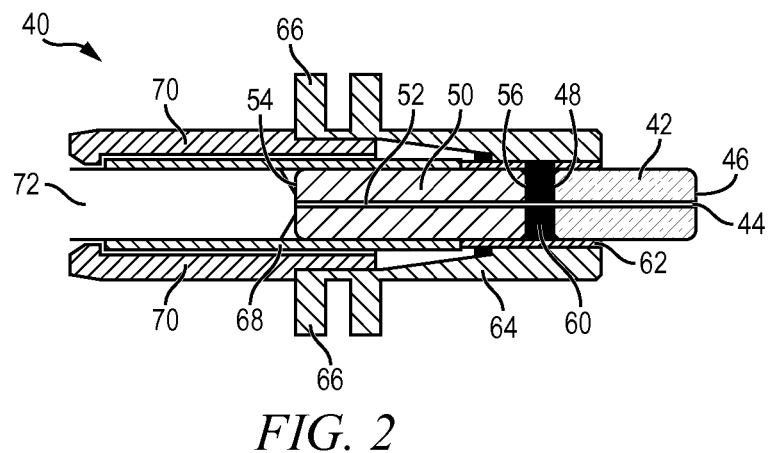
FIG. 2 shows the novel fibre stub assembly where two stubs are co-located in a ceramic sleeve.

FIG. 2 illustrates a novel fibre stub 40. Fibre stub 40 includes a UV transparent output ferrule 42. UV transparent output ferrule 42 includes glass, fused quartz, fused silica, sapphire, alumina, single crystal Al2O3, calcium fluoride, magnesium fluoride, plastic, or other suitable UV transparent material. The center of UV transparent output ferrule 42 contains hole 44. Hole 44 is sized to accommodate an optical fibre. UV transparent output ferrule 42 includes endface 46 and endface 48, opposite endface 46. Fibre stub 40 includes an input ferrule 50. Input ferrule 50 includes ceramic zirconia or other suitable materials. The center of input ferrule 50 contains hole 52. Hole 52 is sized to accommodate an optical fibre. Hole 52 is aligned with hole 44 such that a continuous optical fibre passes through holes 44 and 52. Input ferrule 50 includes endface 54 and endface 56, opposite endface 54. Epoxy 60 is disposed between UV transparent output ferrule 42 and input ferrule 50. Sleeve 62 is disposed over UV transparent output ferrule 42 and input ferrule 50. Sleeve 62 includes zirconia ceramic, aluminum, phosphor bronze, or other suitable materials. Sleeve 62 centers and aligns UV transparent output ferrule 42 and input ferrule 50. Housing 64 houses sleeve 62. Housing 64 includes neck protrusions 66. Housing 64 includes stainless steel, aluminum, phosphor bronze, or other suitable materials. Sleeve 68 is disposed over input ferrule 50 and receptacle 72. Sleeve 68 includes zirconia ceramic, aluminum, phosphor bronze, stainless steel, or other suitable materials. Housing 70 houses sleeve 68 and receptacle 72. Housing 70 includes stainless steel, aluminum, phosphor bronze, or other suitable materials. Receptacle 72 is sized to accommodate a portion of a standard optical connector, such as LC connector 84, as shown in FIG. 3.

Optical fibres contained within fibre optic cables terminate in standard optical connectors, such as LC connectors, ST connectors, SC connectors, FC connectors, MT connectors, or other standard optical fibre terminations. If a cable contains more than one optical fibre, the individual fibres are broken out such that each optical fibre terminates in a useful connection, such as provided by LC connectors, ST connectors, SC connectors, FC connectors, MT connectors, or other standard optical fibre connections. Photonic devices 10 incorporating optical components have receptacles, such as receptacle 72, sized to accommodate one or more connectors, including standard optical connectors such as such as LC connectors, ST connectors, SC connectors, FC connectors, and MT connectors. The receptacles allow for the transmission of modes of light from the core of the optical fibre terminated in the connector to waveguide 28 of photonic device 10 coupled to fibre stub 40.

Figure 3:
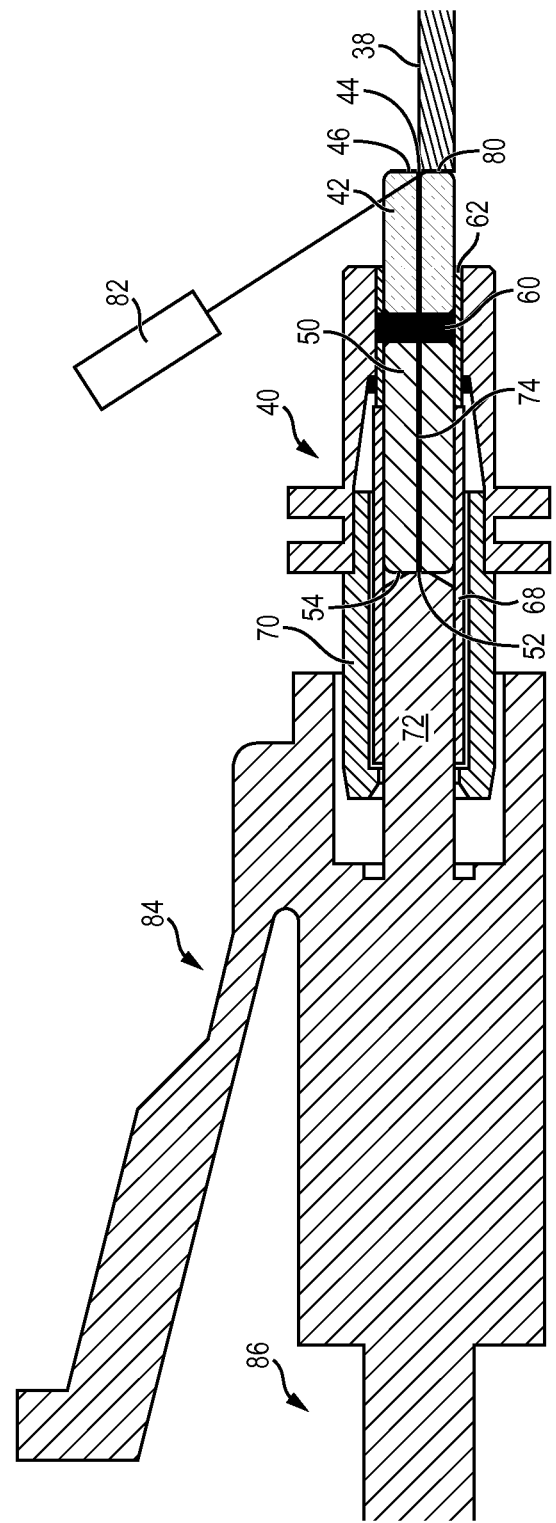
FIG. 3 shows the novel fibre stub with a singlemode optical connector assembly at one end and a waveguide photonic device at the other end joined by a continuous single piece of fibre.

FIG. 3 shows a portion of LC connector 84 disposed in receptacle 72. LC connector 84 includes pigtail 86. Pigtail 86 is a singlemode fibre (SMF) optical cable. Sleeve 68 is disposed over input ferrule 50 and the portion of LC connector 84 inserted into receptacle 72. Sleeve 68 centers and aligns input ferrule 50 and the portion of LC connector 84 inserted into receptacle 72. Optical fibre 74 passes through hole 44 in UV transparent output ferrule 42 and hole 52 in input ferrule 50. Optical fibre 74 is a SMF. Optical fibre 74 is continuous from endface 54 of input ferrule 50 to endface 46 of UV transparent output ferrule 42. Epoxy 60 secures optical fibre 74 in input ferrule 50 and UV transparent output ferrule 42. The end of optical fibre 74 at endface 54 of input ferrule 50 and the end of optical fibre 74 at endface 46 of UV transparent output ferrule 42 are polished. Fibre stub 40 aligns input ferrule 50 and the portion of LC connector 84 inserted into receptacle 72 in position for butt coupling optical fibre 74 with the end of the optical fibre contained in LC connector 84. Sleeve 68 aligns the end of the optical fibre contained in LC connector 84 with the end of optical fibre 74 at endface 54. The end of the optical fibre contained in LC connector 84 connects with the end of optical fibre 74 at endface 54. Accordingly, the junction between the optical fibre contained in LC connector 84 and optical fibre 74 is at the center of endface 54 of input ferrule 50. Fibre stub 40 aligns UV transparent output ferrule 42 and the end of optical fibre 74 in position for butt coupling with the connection point of waveguide 38. The connection point of waveguide 38 connects with the end of optical fibre 74 at endface 46.

A UV curable epoxy 80 is applied to endface 46 of UV transparent output ferrule 42 prior to butt coupling the end of optical fibre 74 to the connection point of waveguide 38. UV curable epoxy 80 has a refractive index selected to match the refractive indices of optical fibre 74 and waveguide 38. UV light source 82 illuminates UV light through UV transparent output ferrule 42 to cure UV curable epoxy 80 disposed on endface 46 of the UV transparent output ferrule joining the UV transparent output ferrule and the end of optical fibre 74 to the connection point of waveguide 38. UV light from UV light source 82 is able to cure UV curable epoxy 80 which is index matched to optical fibre 74 and waveguide 38 through UV transparent output ferrule 42. UV curable epoxy 80 improves performance of signal transmission across the junction at endface 46 by having a refractive index selected to match the refractive indices of optical fibre 74 and waveguide 38. UV curable epoxy 80 is cured to permanently bond UV transparent output ferrule 42 and the end of optical fibre 74 to the connection point of waveguide 38 and improve performance of signal transmission across the junction at endface 46. If ferrule 42 were ceramic, the ferrule would be opaque to UV light. Accordingly, UV light from UV light source 82 would be unable to penetrate a ceramic ferrule and cure UV curable epoxy 80. Because ferrule 42 is comprised of UV transparent material, UV light from UV light source 82 penetrates UV transparent output ferrule 42 and cures UV curable epoxy 80 disposed on endface 46. UV curable epoxy 80 fills the interface between the end of optical fibre 74 and the connection point of waveguide 38 at the junction at endface 46 and includes a refractive index selected to match the refractive indices of the optical fibre and the waveguide.

Fibre stub 40 including UV transparent output ferrule 42 improves return loss and reduces insertion loss at the junction between optical fibre 74 and waveguide 38. UV transparent output ferrule 42 allows UV light from UV light source 82 to cure UV curable epoxy 80. UV curable epoxy 80 fills the interface between the end of optical fibre 74 and the connection point of waveguide 38 at the junction at endface 46 and includes a refractive index selected to match the refractive indices of the optical fibre and the waveguide. Return loss is the amount of signal that is reflected back toward the signal source by a component, such as a junction, due to a refractive index mismatch. The use of index matched UV epoxy 80 at the junction of optical fibre 74 and waveguide 38 reduces refractive index mismatch, which improves return loss. Insertion loss is a comparison of signal power at the point the incident energy, or mode, strikes the junction and the signal power at the point it exits the junction. The use of index matched UV epoxy 80 at the junction of optical fibre 74 and waveguide 38 reduces refractive index mismatch, which means less of the optical signal is reflected back at the junction. If less of the signal is reflected back at the junction, then more of the signal continues past the junction. Accordingly, a reduction in refractive index mismatch reduces insertion loss. Thus fibre stub 40 including UV transparent output ferrule 42 improves return loss and reduces insertion loss at the junction between optical fibre 74 and waveguide 38 by allowing UV light from UV light source 82 to penetrate UV transparent output ferrule 42 and cure index matched UV curable epoxy 80 disposed at the junction at endface 46 between optical fibre 74 and waveguide 38.

Additionally, use of fibre stub 40 including UV transparent output ferrule 42 allows UV light from UV light source 82 to cure UV curable epoxy 80. UV curable epoxy 80 securely aligns waveguide 38 and optical fibre 94 to improve signal transmission across the junction.

Figure 4:
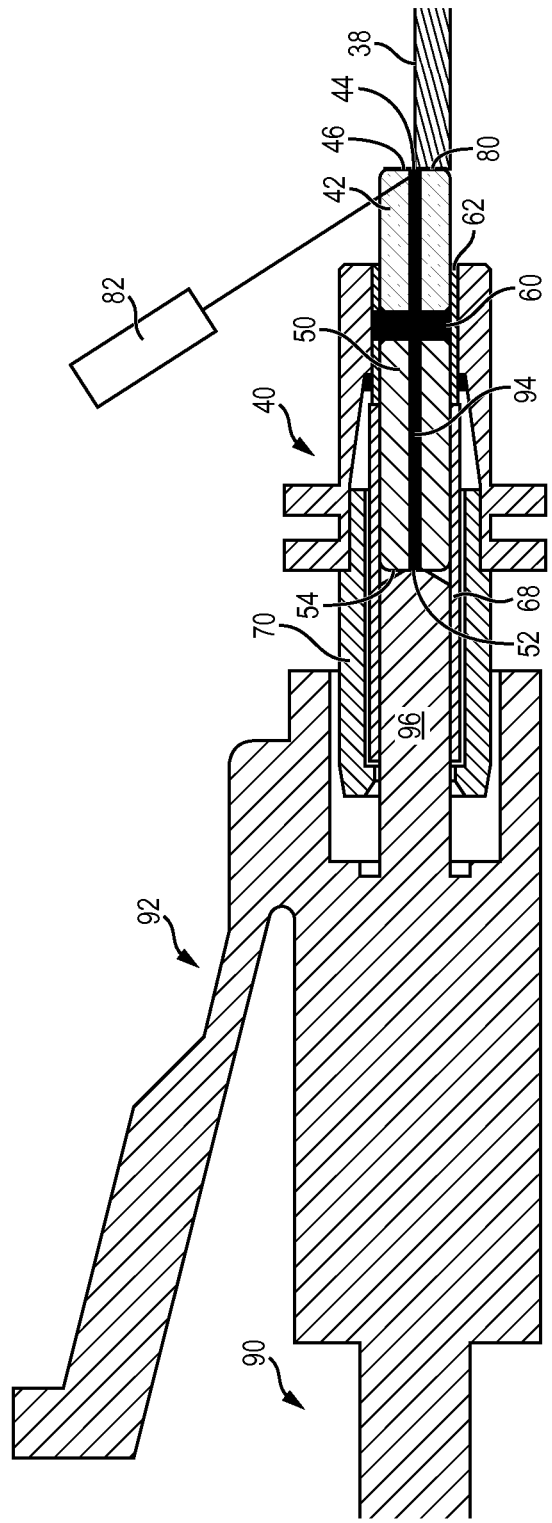
FIG. 4 shows the novel fibre stub with a multimode optical connector assembly at one end and a waveguide photonic device at the other end joined by a continuous single piece of fibre.

FIG. 4 shows the end of waveguide 38 butt coupled to fibre stub 40 in an alternate embodiment for applications requiring a multimode fibre (MMF). Sleeve 62 is disposed over UV transparent output ferrule 42 and input ferrule 50. Sleeve 62 centers and aligns UV transparent output ferrule 42 and input ferrule 50. Optical fibre 94 passes through hole 44 in UV transparent output ferrule 42 and hole 52 in input ferrule 50. UV transparent output ferrule 42 includes glass, fused quartz, fused silica, sapphire, alumina, single crystal Al2O3, calcium fluoride, magnesium fluoride, plastic, or other suitable UV transparent material. Input ferrule 50 includes ceramic zirconia, composite plastic polymers, or other suitable materials. Optical fibre 94 is an MMF. Optical fibre 94 is continuous from endface 54 of input ferrule 50 to endface 46 of UV transparent output ferrule 42. Epoxy 60 secures optical fibre 94 in input ferrule 50 and UV transparent output ferrule 42. Ends of optical fibre 94 at endface 54 of input ferrule 50 and endface 46 of UV transparent output ferrule 42 are polished. Sleeve 68 is disposed over input ferrule 50 and receptacle 96. Sleeve 68 includes zirconia ceramic, aluminum, phosphor bronze, stainless steel, or other suitable materials. Receptacle 96 is sized to accommodate a portion of a standard optical connector, such as LC connector 92. A portion of LC connector 92 is inserted into receptacle 96. Sleeve 68 centers and aligns input ferrule 50 and the portion of LC connector 92 inserted into receptacle 96. LC connector 92 includes optical cable 90. Optical cable 90 is an MMF. Fibre stub 40 aligns input ferrule 50 and the portion of LC connector 92 inserted into receptacle 96 in position for butt coupling the end of optical fibre 94 with the end of the optical fibre terminated in LC connector 92. Sleeve 68 aligns the end of the optical fibre terminated in LC connector 92 with the end of optical fibre 94 at endface 54. The end of the optical fibre terminated in LC connector 92 connects with the end of optical fibre 94 at endface 54. Accordingly, the junction between the optical fibre in LC connector 92 and optical fibre 94 is at the center of endface 54 of input ferrule 50. Fibre stub 40 aligns UV transparent output ferrule 42 and the end of optical fibre 94 in position for butt coupling with the connection point of waveguide 38. The connection point of waveguide 38 connects with the end of optical fibre 94 at endface 46. Accordingly, the junction between waveguide 38 and optical fibre 94 is at the center of endface 46 of UV transparent output ferrule 42.

UV curable epoxy 80 is applied to endface 46 of UV transparent output ferrule 42 prior to butt coupling the end of optical fibre 94 to the connection point of waveguide 38. UV curable epoxy 80 has a refractive index selected to match the refractive indices of optical fibre 94 and waveguide 38. UV light source 82 illuminates UV light through UV transparent output ferrule 42 to cure UV curable epoxy 80 disposed on endface 46 of the UV transparent output ferrule permanently joining the UV transparent output ferrule and the end of optical fibre 94 to the connection point of waveguide 38. UV light from UV light source 82 is able to cure UV curable epoxy 80 which is index matched to the optical fibre and the waveguide through UV transparent output ferrule 42. UV curable epoxy 80 improves performance of signal transmission across the junction at endface 46 by having a refractive index selected to match the refractive indices of optical fibre 94 and waveguide 38. UV curable epoxy 80 is cured to permanently bond UV transparent output ferrule 42 and the end of optical fibre 94 to the connection point of waveguide 38 and improve performance of signal transmission across the junction at endface 46. If ferrule 42 were ceramic, the ferrule would be opaque to UV light. Accordingly, UV light from UV light source 82 would be unable to penetrate a ceramic ferrule and cure UV curable epoxy 80. Because ferrule 42 is comprised of UV transparent material, UV light from UV light source 82 penetrates UV transparent output ferrule 42 and cures UV curable epoxy 80 disposed on endface 46. UV curable epoxy 80 fills the interface between optical fibre 94 and waveguide 38 at the junction at endface 46 and includes a refractive index selected to match the refractive indices of the optical fibre and the waveguide.

Fibre stub 40 including UV transparent output ferrule 42 improves return loss and reduces insertion loss at the junction between optical fibre 94 and waveguide 38. UV transparent output ferrule 42 allows UV light from UV light source 82 to cure UV curable epoxy 80. UV curable epoxy 80 fills the interface between optical fibre 94 and waveguide 38 at the junction at endface 46 and includes a refractive index selected to match the refractive indices of the optical fibre and the waveguide. Return loss is the amount of signal that is reflected back toward the signal source by a component, such as a junction, due to a refractive index mismatch. The use of index matched UV epoxy 80 at the junction of optical fibre 94 and waveguide 38 reduces refractive index mismatch, which improves return loss. Insertion loss is a comparison of signal power at the point the incident energy, or mode, strikes the junction and the signal power at the point it exits the junction. The use of index matched UV epoxy 80 at the junction of optical fibre 94 and waveguide 38 reduces refractive index mismatch, which means less of the optical signal is reflected back at the junction. If less of the signal is reflected back at the junction, then more of the signal continues past the junction. Accordingly, a reduction in refractive index mismatch reduces insertion loss. Thus fibre stub 40 including UV transparent output ferrule 42 improves return loss and reduces insertion loss at the junction between optical fibre 94 and waveguide 38 by allowing UV light from UV light source 82 to penetrate the UV transparent output ferrule and cure index matched UV curable epoxy 80 disposed at the junction at endface 46 between the optical fibre and the waveguide.

Additionally, use of fibre stub 40 including UV transparent output ferrule 42 allows UV light from UV light source 82 to cure UV curable epoxy 80. UV curable epoxy 80 securely aligns waveguide 38 and optical fibre 94 to improve signal transmission across the junction.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of making an optical fibre stub device, comprising:
   providing a first ferrule transparent to UV light;
   providing a second ferrule including a diameter of the second ferrule approximately equal to a diameter of the first ferrule;
   disposing a cylindrical sleeve in contact with the first ferrule and second ferrule to align the first ferrule with the second ferrule, wherein a first endface of the first ferrule faces a first endface of the second ferrule and a second endface of the first ferrule extends from a first end of the sleeve;
   disposing an optical fibre completely through the first ferrule, second ferrule, and sleeve; and
   disposing an epoxy contacting the first endface of the first ferrule and the first endface of the second ferrule.

2. The method of claim 1, further including butt coupling a waveguide to the optical fibre at the second endface of the first ferrule.

3. The method of claim 2, further including disposing a UV curable epoxy between the waveguide and the optical fibre.

4. The method of claim 3, further including curing the UV curable epoxy by illuminating UV light through a side surface of the first ferrule outside of the sleeve.

5. The method of claim 1, wherein the optical fibre includes a mode converter.

6. The method of claim 1, wherein the optical fibre includes a singlemode fibre.

7. The method of claim 1, wherein a second endface of the second ferrule extends from a second end of the sleeve.

8. The method of claim 1, wherein the sleeve includes a cylindrical shape along an entire length of the sleeve, and the entire length of the sleeve is less than a combined length of the first ferrule, second ferrule, and epoxy.

9. A method of making an optical fibre stub device, comprising:
   providing a first ferrule transparent to UV light;
   providing a second ferrule adjacent to the first ferrule;

disposing a first sleeve partially over the first ferrule and second ferrule wherein a portion of the first ferrule is exposed from the first sleeve; and disposing an optical fibre through the first ferrule and second ferrule while the first ferrule and second ferrule are within the first sleeve.

10. The method of claim 9, further including:

providing a fibre pigtail; and disposing a second sleeve over the fibre pigtail to align the first ferrule with the fibre pigtail.

11. The method of claim 9, further including:

disposing a fibre connector adjacent to the second ferrule opposite the first ferrule; and disposing the first sleeve over the second ferrule to align the fibre connector with the second ferrule.

12. An optical fibre stub device, comprising:

a first ferrule transparent to UV light;

a second ferrule;

a sleeve disposed partially over the first ferrule and second ferrule aligning the first ferrule with the second ferrule, wherein a first end of the first ferrule extends out of the sleeve;

an optical fibre disposed through the first ferrule and second ferrule; and a waveguide butt coupled to the optical fibre at the first end of the first ferrule.

13. The optical fibre stub device of claim 12, further including a UV curable epoxy disposed between the waveguide and the optical fibre.

14. The optical fibre stub device of claim 12, wherein the waveguide includes a photonic device.

15. The optical fibre stub device of claim 14, wherein the photonic device includes a passive, active, optical, or photonic component which is opaque to UV light.

16. The optical fibre stub device of claim 14, wherein the optical fibre includes a mode converter for matching to the photonic device.

17. The optical fibre stub device of claim 14, further including an endface optically prepared for connection to the photonic device.

18. The optical fibre stub device of claim 12, wherein the optical fibre includes a singlemode fibre.

19. The optical fibre stub device of claim 12, wherein the optical fibre includes a multimode fibre.

20. The optical fibre stub device of claim 12, wherein a portion of the first ferrule is exposed between the sleeve and waveguide.

* * * * *